US012592232B2

(12) United States Patent
Odiorne et al.

(10) Patent No.: US 12,592,232 B2
(45) Date of Patent: Mar. 31, 2026

(54) SYSTEMS, METHODS, AND APPARATUSES FOR DETECTING AI MASKING USING PERSISTENT RESPONSE TESTING IN AN ELECTRONIC ENVIRONMENT

(71) Applicant: BANK OF AMERICA CORPORATION, Charlotte, NC (US)

(72) Inventors: Mark Alan Odiorne, Waxhaw, NC (US); Tomas M. Castrejon, III, Fort Mill, SC (US); Anuja Mishra, Charlotte, NC (US); Elaina A. Williams, Davidson, NC (US); Christopher David Nobile, Charlotte, NC (US); Kelly Ann Galligan Davila, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 396 days.

(21) Appl. No.: 18/141,182

(22) Filed: Apr. 28, 2023

(65) Prior Publication Data

US 2024/0363107 A1 Oct. 31, 2024

(51) Int. Cl.
*G10L 15/22* (2006.01)

(52) U.S. Cl.
CPC ........ *G10L 15/22* (2013.01); *G10L 2015/223* (2013.01); *G10L 2015/227* (2013.01)

(58) Field of Classification Search
CPC ............... G10L 15/22; G10L 2015/223; G10L 2015/227; G10L 17/08; G10L 17/24; G10L 25/51
See application file for complete search history.

(56) References Cited

U.S. PATENT DOCUMENTS

| | | | |
|---|---|---|---|
| 7,386,105 B2 | 6/2008 | Wasserblat | |
| 8,145,562 B2 | 3/2012 | Wasserblat | |
| 8,311,826 B2 | 11/2012 | Rajakumar | |
| 8,510,215 B2 | 8/2013 | Gutierrez | |
| 8,762,149 B2 | 6/2014 | Asenjo | |
| 8,886,663 B2 | 11/2014 | Gainsboro | |

(Continued)

FOREIGN PATENT DOCUMENTS

| | | |
|---|---|---|
| JP | 2012134647 A | 7/2012 |
| JP | 5222680 B2 | 6/2013 |

*Primary Examiner* — Mark Villena

(74) *Attorney, Agent, or Firm* — Moore & Van Allen PLLC; Lauren M. Stokes

(57) ABSTRACT

Systems, computer program products, and methods are described herein for detecting artificial intelligence (AI) masking using persistent response testing. The present invention is configured to identify a vocal request; generate a primary prompt associated with the vocal request; receive, based on the primary prompt, a primary vocal cue data; determine at least one primary vocal characteristic based the primary vocal cue data; generate at least one secondary prompt associated with the vocal request for at least one second period; receive, based on the at least one secondary prompt, at least one secondary vocal cue data; determine at least one secondary vocal characteristic based on the one secondary vocal cue data; compare the at least one primary vocal characteristic to the at least one secondary vocal characteristic; and determine, based on the comparison, whether the vocal request is based on artificial intelligence (AI).

20 Claims, 6 Drawing Sheets

(56) References Cited

U.S. PATENT DOCUMENTS

| | | | |
|---|---|---|---|
| 8,924,285 B2 | 12/2014 | Rajakumar | |
| 9,113,001 B2 | 8/2015 | Rajakumar | |
| 9,596,356 B2 | 3/2017 | Flaks | |
| 9,800,721 B2 | 10/2017 | Gainsboro | |
| 9,940,930 B1* | 4/2018 | Campbell | G10L 15/22 |
| 10,079,024 B1* | 9/2018 | Bhimanaik | G10L 17/02 |
| 10,277,590 B2 | 4/2019 | Chari | |
| 10,346,842 B2 | 7/2019 | Murgai | |
| 10,410,636 B2 | 9/2019 | Warford | |
| 10,834,251 B2 | 11/2020 | Newman | |
| 11,972,760 B1* | 4/2024 | Chavez | G10L 15/08 |
| 2007/0266154 A1 | 11/2007 | Ohta | |
| 2015/0112682 A1* | 4/2015 | Rodriguez | G10L 17/26 |
| | | | 704/249 |
| 2015/0381801 A1 | 12/2015 | Rajakumar | |
| 2021/0074260 A1* | 3/2021 | Gopala | G06N 3/047 |
| 2021/0074305 A1* | 3/2021 | Gopala | G10L 25/30 |
| 2022/0036904 A1* | 2/2022 | Traynor | G10L 25/51 |
| 2022/0138472 A1* | 5/2022 | Mittal | G10L 25/30 |
| | | | 382/181 |
| 2022/0269796 A1 | 8/2022 | Chase | |
| 2022/0269922 A1* | 8/2022 | Mathews | G06V 20/46 |
| 2022/0328050 A1* | 10/2022 | Hennig | G10L 17/22 |
| 2025/0140263 A1* | 5/2025 | Castan Lavilla | G10L 17/04 |

* cited by examiner

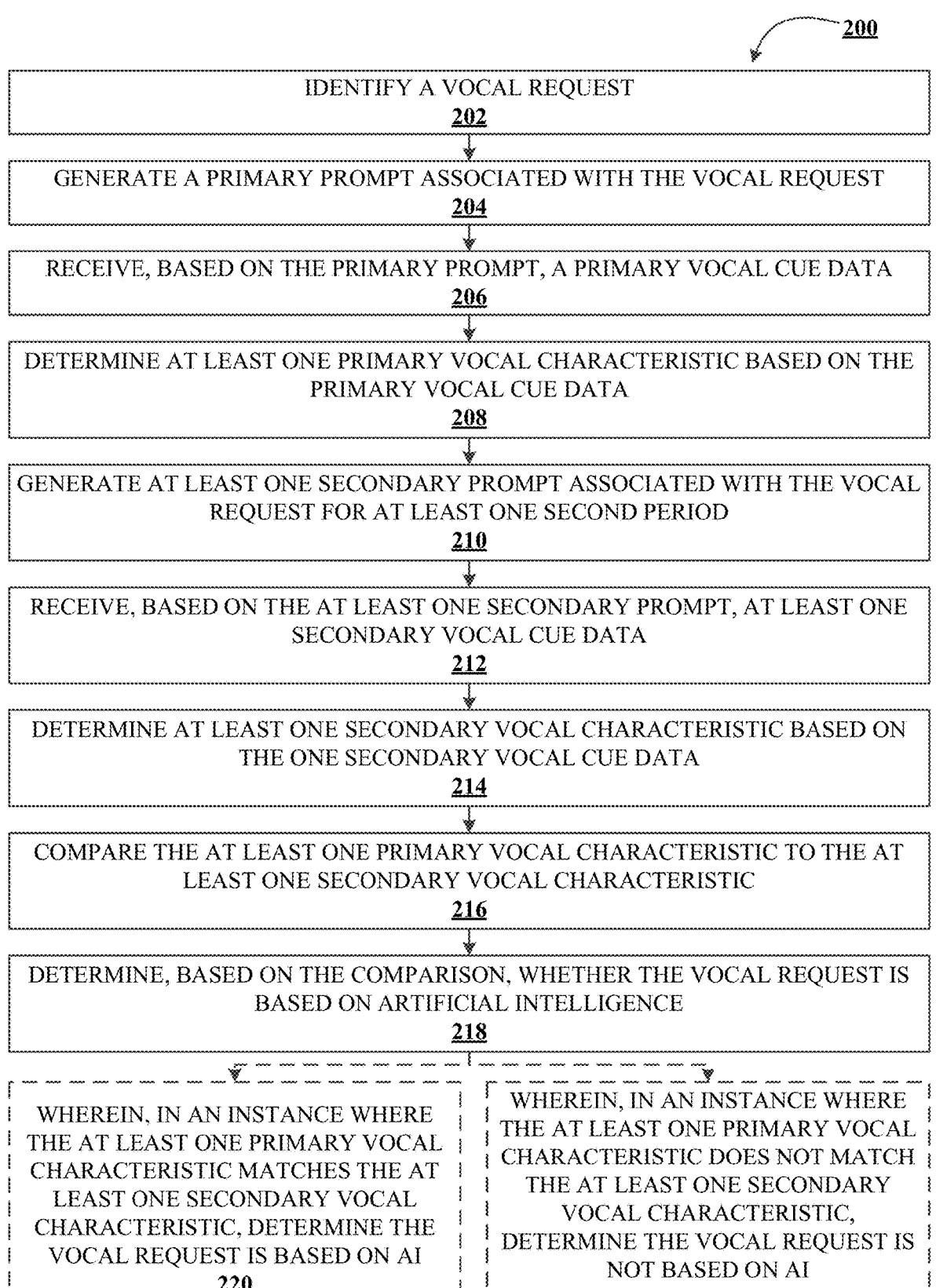

200

IDENTIFY A VOCAL REQUEST
202

GENERATE A PRIMARY PROMPT ASSOCIATED WITH THE VOCAL REQUEST
204

RECEIVE, BASED ON THE PRIMARY PROMPT, A PRIMARY VOCAL CUE DATA
206

DETERMINE AT LEAST ONE PRIMARY VOCAL CHARACTERISTIC BASED ON THE PRIMARY VOCAL CUE DATA
208

GENERATE AT LEAST ONE SECONDARY PROMPT ASSOCIATED WITH THE VOCAL REQUEST FOR AT LEAST ONE SECOND PERIOD
210

RECEIVE, BASED ON THE AT LEAST ONE SECONDARY PROMPT, AT LEAST ONE SECONDARY VOCAL CUE DATA
212

DETERMINE AT LEAST ONE SECONDARY VOCAL CHARACTERISTIC BASED ON THE ONE SECONDARY VOCAL CUE DATA
214

COMPARE THE AT LEAST ONE PRIMARY VOCAL CHARACTERISTIC TO THE AT LEAST ONE SECONDARY VOCAL CHARACTERISTIC
216

DETERMINE, BASED ON THE COMPARISON, WHETHER THE VOCAL REQUEST IS BASED ON ARTIFICIAL INTELLIGENCE
218

WHEREIN, IN AN INSTANCE WHERE THE AT LEAST ONE PRIMARY VOCAL CHARACTERISTIC MATCHES THE AT LEAST ONE SECONDARY VOCAL CHARACTERISTIC, DETERMINE THE VOCAL REQUEST IS BASED ON AI
220

WHEREIN, IN AN INSTANCE WHERE THE AT LEAST ONE PRIMARY VOCAL CHARACTERISTIC DOES NOT MATCH THE AT LEAST ONE SECONDARY VOCAL CHARACTERISTIC, DETERMINE THE VOCAL REQUEST IS NOT BASED ON AI
222

FIGURE 2

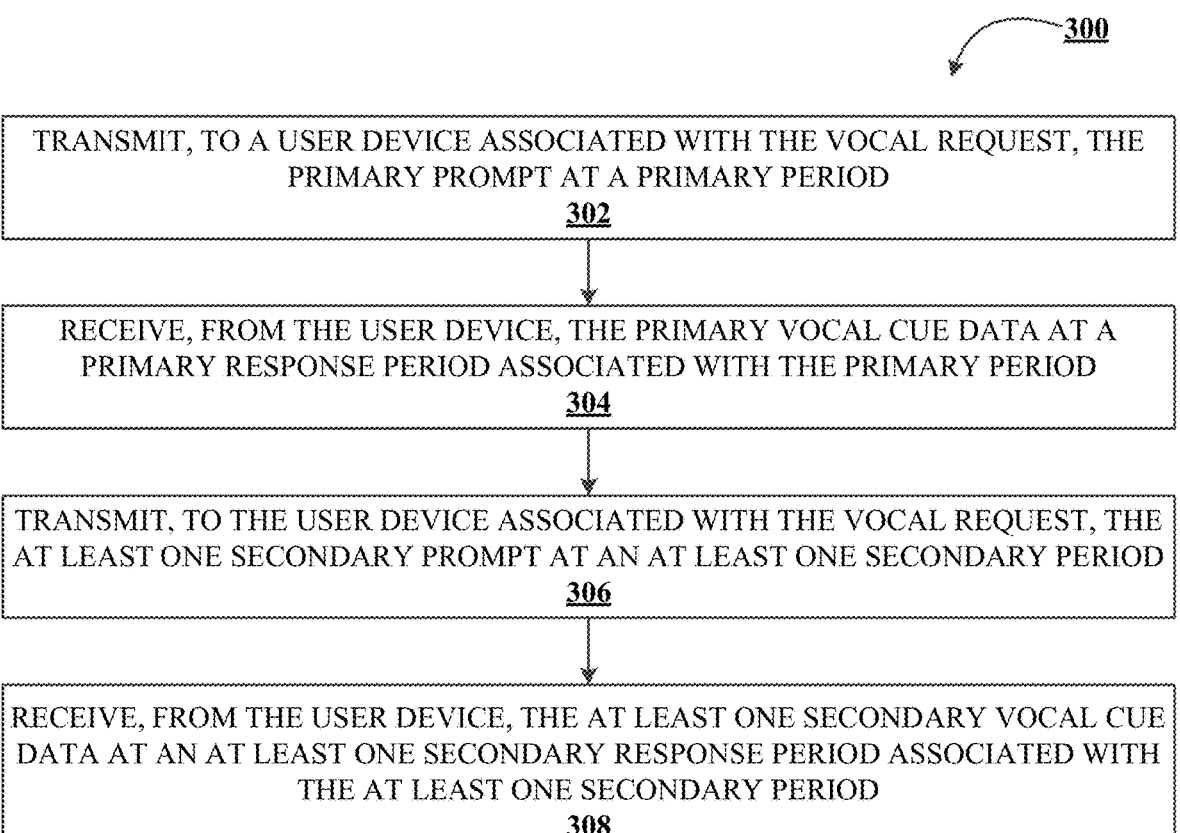

TRANSMIT, TO A USER DEVICE ASSOCIATED WITH THE VOCAL REQUEST, THE
PRIMARY PROMPT AT A PRIMARY PERIOD
302

RECEIVE, FROM THE USER DEVICE, THE PRIMARY VOCAL CUE DATA AT A
PRIMARY RESPONSE PERIOD ASSOCIATED WITH THE PRIMARY PERIOD
304

TRANSMIT, TO THE USER DEVICE ASSOCIATED WITH THE VOCAL REQUEST, THE
AT LEAST ONE SECONDARY PROMPT AT AN AT LEAST ONE SECONDARY PERIOD
306

RECEIVE, FROM THE USER DEVICE, THE AT LEAST ONE SECONDARY VOCAL CUE
DATA AT AN AT LEAST ONE SECONDARY RESPONSE PERIOD ASSOCIATED WITH
THE AT LEAST ONE SECONDARY PERIOD
308

FIGURE 3

SYSTEMS, METHODS, AND APPARATUSES FOR DETECTING AI MASKING USING PERSISTENT RESPONSE TESTING IN AN ELECTRONIC ENVIRONMENT

FIELD OF THE INVENTION

The present invention embraces a system for detecting AI masking using persistent response testing in an electronic environment.

BACKGROUND

Electronic resources and their associated accounts face new issues concerning cyber-attacks, privacy and security attacks, and misappropriation attempts through the use of AI masking. For instance, users may access the electronic resources by submitting a request (such as a vocal request) and systems may have a difficult time determining whether the access attempts have been generated by artificial intelligence systems. Specifically, there exists an issue in today's electronic environment where artificial intelligence (AI) may be used to access the electronic resources and their associated accounts by masking themselves to appear like the authenticated user of the account. For example, and where a request is generated and submitted as a vocal request over the phone and/or over other electronic means (such as where a manager and/or operator of the electronic resource cannot confirm the generator of the vocal request is a human), an issue arises where AI has access to authentication credentials of the resource accounts/user accounts and can generate a vocal request to access said accounts. Thus, there exists a need for a system configured to accurately, efficiently, and securely determine whether a vocal request is generated by a human and/or be AI.

Applicant has identified a number of deficiencies and problems associated with detecting AI masking using persistent response testing in an electronic environment. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for detecting AI masking using persistent response testing in an electronic environment. The system may comprise a memory device with computer-readable program code stored thereon; at least one processing device operatively coupled to the at least one memory device and the at least one communication device, wherein executing the computer-readable code is configured to cause the at least one processing device to perform the following operations: identify a vocal request; generate a primary prompt associated with the vocal request; receive, based on the primary prompt, a primary vocal cue data; determine at least one primary vocal characteristic based the primary vocal cue data; generate at least one secondary prompt associated with the vocal request for at least one second period; receive, based on the at least one secondary prompt, at least one secondary vocal cue data; determine at least one secondary vocal characteristic based on the one secondary vocal cue data; compare the at least one primary vocal characteristic to the at least one secondary vocal characteristic; and determine, based on the comparison, whether the vocal request is based on artificial intelligence (AI), wherein, in an instance where the at least one primary vocal characteristic matches the at least one secondary vocal characteristic, determine the vocal request is based on AI. In some embodiments, and wherein, in an instance where the at least one primary vocal characteristic does not match the at least one secondary vocal characteristic, determine the vocal request is not based on AI.

In some embodiments, the primary prompt comprises at least one request for at least one vocal cue.

In some embodiments, the computer-readable code is configured to cause the at least one processing device to perform the following operations: transmit, to a user device associated with the vocal request, the primary prompt at a primary period; receive, from the user device, the primary vocal cue data at a primary response period associated with the primary period; transmit, to the user device associated with the vocal request, the at least one secondary prompt at an at least one secondary period; and receive, from the user device, the at least one secondary vocal cue data at an at least one secondary response period associated with the at least one secondary period.

In some embodiments, the computer-readable code is configured to cause the at least one processing device to perform the following operation trigger, based on the vocal request, a sound capture for a plurality of vocal cues associated with the vocal request, wherein the plurality of vocal cues comprises at least the primary vocal cue data and the at least one secondary vocal cue data.

In some embodiments, the primary prompt and the at least one secondary prompt are the same.

In some embodiments, the primary vocal characteristic comprises at least one of a volume, frequency, pitch, rate, rhythm, fluency, articulation, pronunciation, enunciation, or tone. In some embodiments, the at least one secondary vocal characteristic comprises at least one a volume, frequency, pitch, rate, rhythm, fluency, articulation, pronunciation, enunciation, or tone. In some embodiments, the at least one secondary vocal characteristic is a same characteristic type as the primary vocal characteristic.

In another aspect, a computer program product for detecting artificial intelligence (AI) masking using persistent response testing is provided. In some embodiments, the computer program product comprises at least one non-transitory computer-readable medium having computer-readable program code portions embodied therein, the computer-readable program code portions which when executed by a processing device are configured to cause the processor to perform the following operations: identify a vocal request; trigger, based on the vocal request, a sound capture for a plurality of vocal cues associated with the vocal request; generate a primary prompt associated with the vocal request; receive, based on the primary prompt, a primary vocal cue data; determine at least one primary vocal characteristic based the primary vocal cue data; generate at least one secondary prompt associated with the vocal request for at least one second period; receive, based on the at least one secondary prompt, at least one secondary vocal cue data;

determine at least one secondary vocal characteristic based on the one secondary vocal cue data; compare the at least one primary vocal characteristic to the at least one secondary vocal characteristic; and determine, based on the comparison, whether the vocal request is based on artificial intelligence (AI), wherein, in an instance where the at least one primary vocal characteristic matches the at least one secondary vocal characteristic, determine the vocal request is based on AI. In some embodiments, and wherein, in an instance where the at least one primary vocal characteristic does not match the at least one secondary vocal characteristic, determine the vocal request is not based on AI.

In some embodiments, the primary prompt comprises at least one request for at least one vocal cue of the plurality of vocal cues.

In some embodiments, the processing device is configured to cause the processor to perform the following operations: transmit, to a user device associated with the vocal request, the primary prompt at a primary period; receive, from the user device, the primary vocal cue data at a primary response period associated with the primary period; transmit, to the user device associated with the vocal request, the at least one secondary prompt at an at least one secondary period; and receive, from the user device, the at least one secondary vocal cue data at an at least one secondary response period associated with the at least one secondary period.

In some embodiments, the primary prompt and the at least one secondary prompt are the same.

In some embodiments, the primary vocal characteristic comprises at least one of a volume, frequency, pitch, rate, rhythm, fluency, articulation, pronunciation, enunciation, or tone. In some embodiments, the at least one secondary vocal characteristic comprises at least one a volume, frequency, pitch, rate, rhythm, fluency, articulation, pronunciation, enunciation, or tone. In some embodiments, the at least one secondary vocal characteristic is a same characteristic type as the primary vocal characteristic.

In another aspect, a computer implemented method for detecting artificial intelligence (AI) masking using persistent response testing is provided. In some embodiments, the computer implemented method may comprise: identifying a vocal request; triggering, based on the vocal request, a sound capture for a plurality of vocal cues associated with the vocal request; generating a primary prompt associated with the vocal request; receiving, based on the primary prompt, a primary vocal cue data; determining at least one primary vocal characteristic based the primary vocal cue data; generating at least one secondary prompt associated with the vocal request for at least one second period; receiving, based on the at least one secondary prompt, at least one secondary vocal cue data; determining at least one secondary vocal characteristic based on the one secondary vocal cue data; comparing the at least one primary vocal characteristic to the at least one secondary vocal characteristic; and determining, based on the comparison, whether the vocal request is based on artificial intelligence (AI), wherein, in an instance where the at least one primary vocal characteristic matches the at least one secondary vocal characteristic, determining the vocal request is based on AI. In some embodiments, and wherein, in an instance where the at least one primary vocal characteristic does not match the at least one secondary vocal characteristic, determining the vocal request is not based on AI.

In some embodiments, the primary prompt comprises at least one request for at least one vocal cue of the plurality of vocal cues.

In some embodiments, the computer implemented method may further comprise: transmitting, to a user device associated with the vocal request, the primary prompt at a primary period; receiving, from the user device, the primary vocal cue data at a primary response period associated with the primary period; transmitting, to the user device associated with the vocal request, the at least one secondary prompt at an at least one secondary period; and receiving, from the user device, the at least one secondary vocal cue data at an at least one secondary response period associated with the at least one secondary period.

In some embodiments, the primary vocal characteristic comprises at least one of a volume, frequency, pitch, rate, rhythm, fluency, articulation, pronunciation, enunciation, or tone. In some embodiments, the at least one secondary vocal characteristic comprises at least one a volume, frequency, pitch, rate, rhythm, fluency, articulation, pronunciation, enunciation, or tone.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
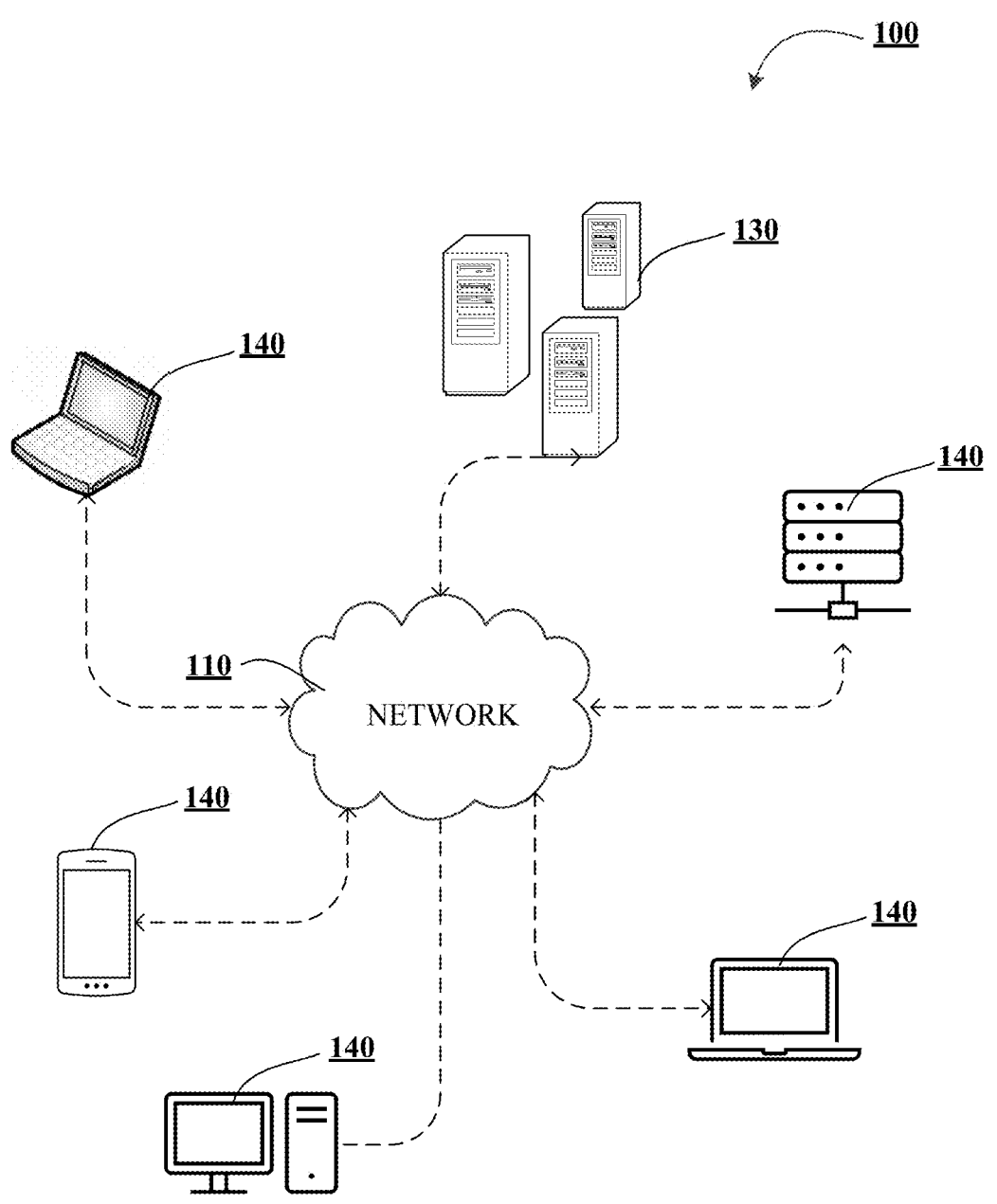
Figure 1B:
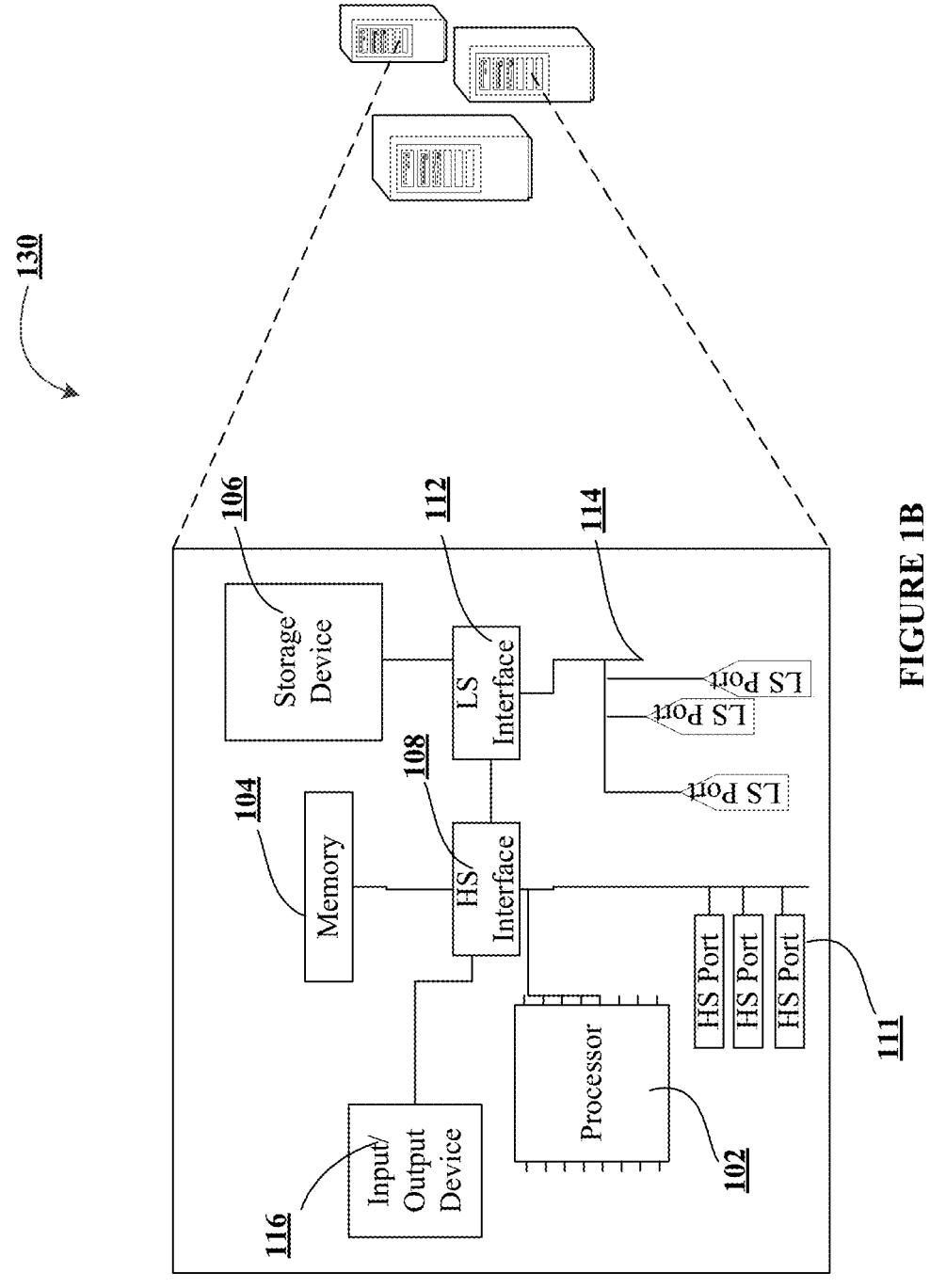
Figure 1C:
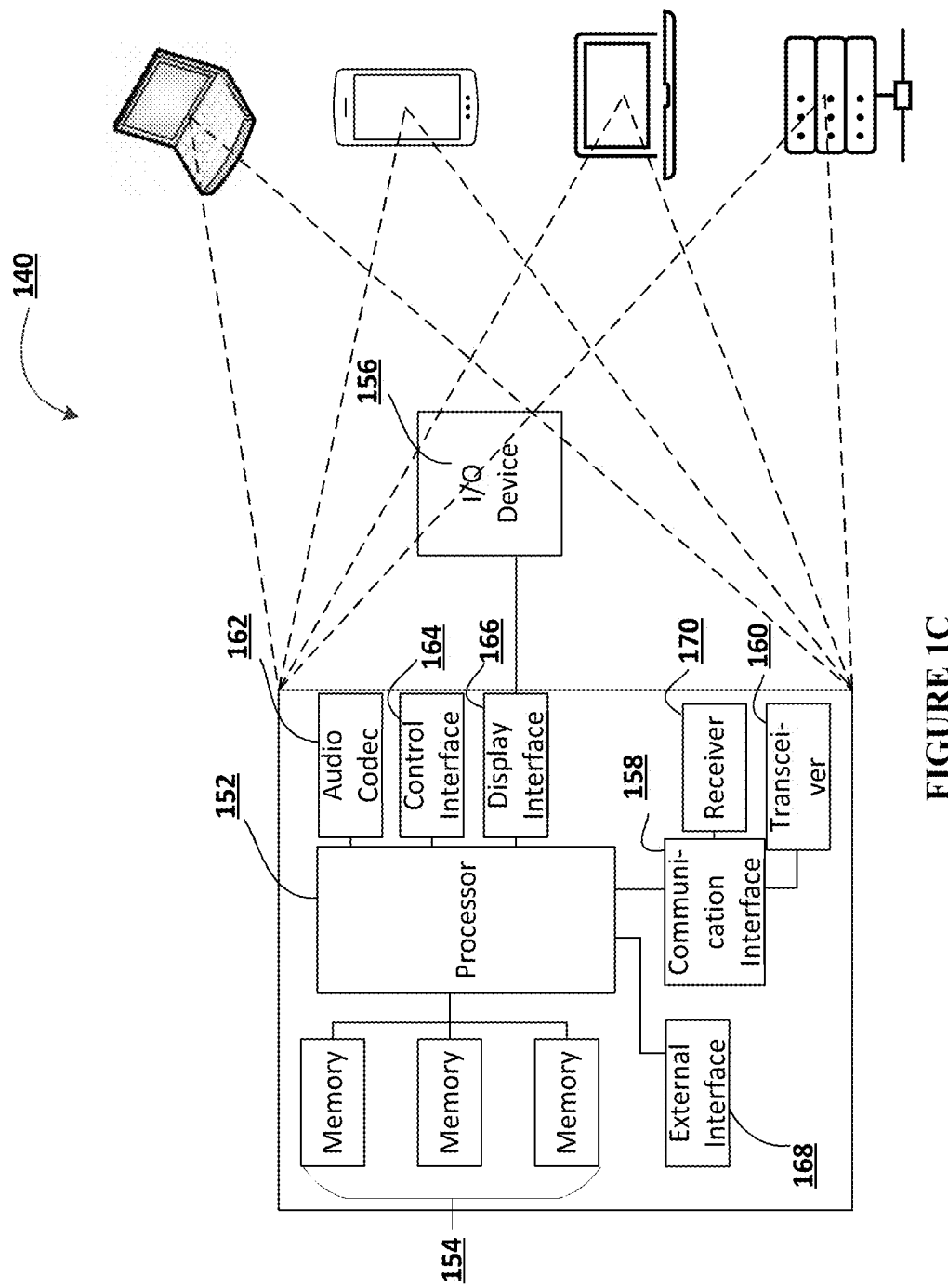
Figure 4:
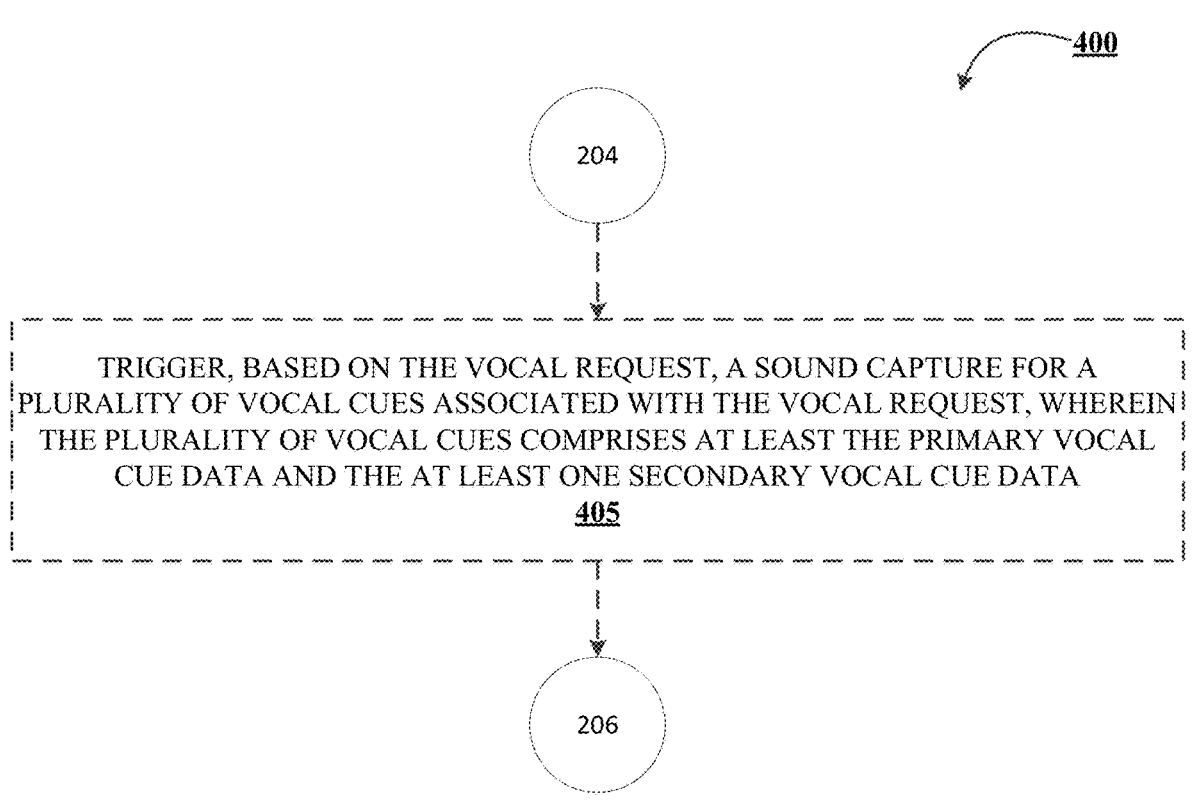

Having thus described embodiments of the invention in general terms, reference will now be made the accompanying drawings, wherein:

FIGS. 1A-1C illustrates technical components of an exemplary distributed computing environment for detecting AI masking using persistent response testing in an electronic environment, in accordance with an embodiment of the disclosure;

FIG. 2 illustrates a process flow for detecting AI masking using persistent response testing in an electronic environment, in accordance with an embodiment of the disclosure;

FIG. 3 illustrates a process flow for receiving vocal cue data based on response period(s), in accordance with an embodiment of the disclosure; and FIG. 4 illustrates a process flow for detecting triggering a sound capture for a plurality of vocal cues, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an individual (human, electronic (e.g., an AI engine, a chatGPT engine, and/or the like), and/or the like) that submitted the vocal request to access a user account, resource account, and/or the like. In some such embodiments, the user may be a member of the entity, a client of the entity, and/or the like, whereby the entity may be associated with storing and operating the user account, resource account, and/or the like. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the authentication credentials may be submitted after the vocal request is transmitted, whereby the authentication credentials may be used to identify the user account/resource account which the user requests access. In some embodiments, the authentication credentials may be submitted with the vocal request, such that the vocal request comprises a user account identifier for the AI detection system.

In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As mentioned above, managers of electronic resources, whereby users may access the electronic resources by submitting a request (such as a vocal request), may have a difficult time determining potential attacks by artificial intelligence systems in an easy and streamlined manner. Specifically, there exists an issue in today's environment where artificial intelligence (AI) may be used to access the electronic resources and their associated accounts by masking themselves to appear like the authenticated user of the account. For instance, and where a request is generated and submitted as a vocal request over the phone and/or over other electronic means (such as where a manager and/or operator of the electronic resource cannot confirm the generator of the vocal request is a human), an issue arises where AI has access to authentication credentials of the resource accounts/user accounts and can generate a vocal request to access said accounts. Thus, there exists a need for a system configured to accurately, efficiently, and securely determine whether a vocal request is generated by a human and/or be AI.

Accordingly, the system described herein (i.e., an AI detection system) acts by identifying a vocal request; generating a primary prompt (e.g., a request for the "user"—a human or AI—that generated the vocal request to answer and/or perform an action) associated with the vocal request; receiving, based on the primary prompt, a primary vocal cue data (e.g., based on the response and/or action performed by the "user"); and determining at least one primary vocal characteristic (e.g., volume, frequency, tone, pitch, rate, rhythm, fluency, articulation, pronunciation, enunciation, and/or tone) based the primary vocal cue data. The system may further act by generating at least one secondary prompt (e.g., at least one secondary request for the "user") associated with the vocal request for at least one second period; receiving, based on the at least one secondary prompt, at least one secondary vocal cue data; determining at least one secondary vocal characteristic based on the one secondary vocal cue data; and comparing the at least one primary vocal characteristic to the at least one secondary vocal characteristic (e.g., comparing the vocal characteristic types of the primary vocal characteristic(s) and the at least one secondary vocal characteristic(s)). Further, the system may act by determining, based on the comparison, whether the vocal request is based on artificial intelligence (AI), wherein, in an instance where the at least one primary vocal characteristic matches the at least one secondary vocal characteristic, determining the vocal request is based on AI (generated by AI), or wherein, in an instance where the at least one primary vocal characteristic does not match the at least one secondary vocal characteristic, determine the vocal request is not based on AI (generated by a human).

What is more, the present invention provides a technical solution to a technical problem. As described herein, the technical problem includes the detecting AI masking when receiving vocal requests for access to electronic resources. The technical solution presented herein allows for the accurate, efficient, and secure detection of AI masking based on detecting vocal requests, generating a plurality of prompts, receiving a plurality of responses to the prompts, and determining vocal characteristics of the responses. In particular, the AI detection system is an improvement over existing solutions to the detection of AI masking, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for detecting AI masking using persistent response testing in an electronic environment 100, in accordance with an embodiment of the invention. As shown in FIG. 1A, the distributed computing environment 100 contemplated herein may include a system 130 (i.e., an AI detection system), an end-point device(s) 140, and a network 110 over which the system 130 and the end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices and user devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like. Further, and in some embodiments, such electronic devices and user devices may comprise sound capture components and devices, such as a microphone(s) and/or the like. In this manner, the user device(s) may be configured to capture sound created by the user (and/or other such sounds adjacent to the user), such as responses, performance sounds by the user, and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer—or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a Microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources and whether the user is an AI or human. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information (such as vocal cue data, which may be used to generate vocal characteristics). Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for detecting AI masking using persistent response testing in an electronic environment, in accordance with an embodiment of the disclosure. In some embodiments, a system (e.g., similar to one or more of the systems described herein with respect to FIGS. 1A-1C and 2) may perform one or more of the steps of process flow 200. For example, an AI detection system (e.g., the system 130 described herein with respect to FIG. 1A-1C) may perform the steps of process flow 200.

As shown in block 202, the process flow 200 may include the step of identifying a vocal request. In some embodiments, the AI detection system may identify a vocal request by receiving a vocal request from a user device—such as a mobile device, a computing device, and/or the like, that is capable of receiving a sound (e.g., comprises a microphone)—that transmits the vocal request to the AI detection system. Such a transmission may occur via a network, such as network 110 shown in FIG. 1A. In some embodiments, the vocal request may comprise a user's (e.g., a user associated with the user device) request to access a user account associated with an entity. For instance, a vocal request may comprise a request to access a particular user account and/or a particular resource account associated with a user account, whereby the vocal request may further comprise at least a user account identifier. Such a user account identifier may comprise a unique string of alphanumeric characters which uniquely identifies a particular user account within the AI detection system, a particular user account associated with the AI detection system (e.g., associated with a client of the AI detection system), and/or the like.

In some embodiments, the vocal request captured by the user device may be transmitted to the AI detection system, and the AI detection system may be stored and/or operated at a processing center designed to determine whether to allow or deny access to the user account. In some embodiments, such a processing center may be owned and/or operated by a manager of the AI detection system, by a client of the AI detection system (e.g., a financial institution), and/or the like. In some embodiments, such a processing center may further be configured to store data associated with at least the particular user account identified in the vocal request (and/or resource account), whereby the processing center (which may comprise the AI detection system) may act—by itself—to determine whether to allow or deny access to the user account and may actually allow or deny access to the user account based on the detection of the vocal request being AI generated.

As shown in block 204, the process flow 200 may include the step of generating a primary prompt associated with the vocal request. In some embodiments, the AI detection system may generate a primary prompt—or a first prompt—associated with the vocal request. For instance, and as used herein, each of the prompts (i.e., primary prompt, at least one secondary prompt, and/or the like) described herein may describe a question and/or request for a response/action from the user that submitted the vocal request. Thus, and in some embodiments, the primary prompt may comprise a question and/or a request for the user to say something into the user device.

In some embodiments, the primary prompt may comprise a request for the user to say a particular phrase, a request for the user to pick out certain words from the primary prompt (such as a vocal reCAPTCHA), a request for the user to perform a particular activity and/or sound (e.g., make a particular sound that is not linked to a particular word), and/or the like. In this manner, the AI detection system may parse the sound data captured by the user device in order to determine the user's vocal characteristics. In some embodiments, and where the user is artificial intelligence (AI) based, the "user" that submitted the vocal request may not have many and/or any variations in their vocal characteristics between prompts. However, and where the user is human based (i.e., the user is a human and not AI based), the user that submitted the vocal request will likely have variations in their vocal characteristics between prompts. Such embodiments are described in further detail below.

As shown in block 206, the process flow 200 may include the step of receiving, based on the primary prompt, primary vocal cue data. In some embodiments, the AI detection system may receive—based on the primary prompt—a response (vocal cue data) from the user device. In some embodiments, the vocal cue data may comprise a real-time vocal response from the user of the user device, a recorded vocal response from the user of the user device, and/or the like. Further, and in the embodiments where the vocal cue data is a real-time vocal response, the real-time response may be recorded by the AI detection system and parsed to generate the vocal cue data from the response.

In some embodiments, and by way of non-limiting example, the vocal cue data may comprise data regarding the volume of the response (e.g., such as in decibels), the length of the response, the frequency of the words/terms/sounds at higher volumes (as compared to sounds at a lower volume or amplitude), and/or the like. In some embodiments, the AI detection system may receive vocal cue data from the user device as recorded data from a pre-determined period (e.g., a predetermined period for recording response data). In some embodiments, the AI detection system may determine pauses between the responses received (e.g., pauses in the vocal cue data where the vocal cue data comprises a low volume for an extended period, such as a few seconds, ten seconds, fifteen seconds, thirty seconds, and/or the like), and may parse the vocal cue data up to these pauses to determine the vocal characteristic(s). Thus, and in some embodiments, the AI detection system may be configured to receive all the data from the user device's microphone and/or other such sound recording device, parse the data, and determine vocal characteristic(s).

Further, and in some embodiments, the AI detection system may transmit—to a user device associated with the vocal request—the primary prompt and at least one secondary prompt. Such an embodiment is disclosed in further detail below.

As shown in block 208, the process flow 200 may include the step of determining at least one primary vocal characteristic based on the primary vocal cue data. In some embodiments, the AI detection system may determine at least one primary vocal characteristic based on parsing the primary vocal cue data, whereby the primary vocal characteristic(s) may comprise information regarding the response received from the primary prompt. In some embodiments, the primary vocal characteristic(s) may comprise at least one of a volume, frequency, pitch, rate, rhythm, fluency, articulation, pronunciation, enunciation, and/or tone. In some embodiments, the primary vocal characteristic may comprise a combination of the listed vocal characteristic types (e.g., the volume, frequency, pitch, rate, rhythm, fluency, articulation, pronunciation, enunciation, and/or tone), based on the parsing of the primary vocal cue data. In some embodiments, the primary vocal characteristic types for the primary vocal characteristic(s) may be determined by the AI detection system based on matching the primary vocal cue data parsed to the primary vocal characteristic type(s) (e.g., the volume in decibels may be matched to the volume of the primary vocal characteristic(s)). Further, and as a person of skill in the art will realize, the use of the volume characteristic type described herein to match the primary vocal cue data to the primary vocal characteristic type further includes, but is not limited to, the other types of vocal characteristic types described herein.

As shown in block 210, the process flow 200 may include the step of generating at least one secondary prompt associated with the vocal request for at least one second period. In some embodiments, the AI detection system may generate at least one secondary prompt (e.g., at least one request for the user associated with the vocal request—which may comprise a human user, an AI user, and/or the like—to do and/or say something). In some embodiments, the at least one secondary prompt may comprise a plurality of prompts (e.g., a plurality of requests and/or questions) which may be transmitted to the user device at a plurality of periods. In some embodiments, the at least one secondary prompt may comprise a queued and/or sequential listing of prompts to ask and/or request the user of the user device. Further, and in some embodiments, at least one prompt of the at least one secondary prompt may comprise the same prompt of the primary prompt. In this manner, the AI detection system may transmit the same request and/or question multiple times to the user device so that the user may answer and/or perform the request multiple times and the AI detection system may compare the data of both responses (compare the primary vocal characteristic(s) and the at least one secondary vocal characteristic(s)) for the same prompt to determine whether the vocal request is AI based or human based. In some embodiments, the at least one secondary prompt may comprise a plurality of prompts whereby at least two prompts of the plurality of prompts may comprise the same prompt.

In some embodiments, the at least one secondary prompt may comprise different prompt(s) from the primary prompt. In this manner, the AI detection system may compare at least one secondary vocal characteristic(s) to the primary vocal characteristic(s) for different prompts and determine whether the secondary vocal characteristic(s) are showing signs of fatigue, annoyance, changes in demeanor, and/or the like. Further, and as shown herein, such a showing of fatigue, annoyance, changes in demeanor, and/or the like between the primary vocal characteristic(s) and the at least one secondary vocal characteristic(s) allows the AI detection system to determine the user associated with the vocal request is human-based as an AI-based user would be unlikely to show fatigue, annoyance, changes in demeanor and other such human vocal characteristics.

As shown in block 212, the process flow 200 may include the step of receiving, based on the at least one secondary prompt, at least one secondary vocal cue data. In some embodiments, the AI detection system may receive—based on the at least one secondary prompt(s) generated—the at least one secondary vocal cue data, whereby each secondary vocal cue data is based on each secondary prompt generated and transmitted to the user device. Thus, and in some embodiments, for each of the generated and transmitted prompts sent to the user device, the AI detection system may be configured to receive vocal response data (vocal cue data) from the user device, parse the vocal cue data and determine the at least one vocal characteristics for each response. Such vocal characteristics for the at least one secondary prompt(s) is described in further detail below.

As shown in block 214, the process flow 200 may include the step of determining at least one secondary vocal characteristic based on the one secondary vocal cue data. In some embodiments, the AI detection system may determine at least one secondary vocal characteristic(s) based on the at least one secondary vocal cue data received, whereby the at least one secondary vocal characteristic(s) may be determined based on parsing the at least one secondary vocal cue data. Further, and as used herein, the at least one secondary vocal characteristic(s) may comprise vocal characteristic types such as, but not limited to, volume, frequency, pitch, rhythm, fluency, articulation, pronunciation, enunciation, and/or tone.

As shown in block 216, the process flow 200 may include the step of comparing the at least one primary vocal characteristic to the at least one secondary vocal characteristic. In some embodiments, the AI detection system may compare each of the primary vocal characteristics determined against the same characteristic type of the at least one secondary vocal characteristic(s). For instance, and where the primary vocal characteristics comprises data for volume and where the at least one secondary vocal characteristic comprises data for volume, the data for the volume of the primary vocal characteristic and the data for the volume at least one secondary vocal characteristic may be compared. As a person of skill in the art will understand, the volume characteristic type described herein for comparing the primary vocal characteristic and the at least one secondary vocal characteristic(s) is meant to show an exemplary use only and is not meant to be limiting in any manner. Thus, and in some embodiments, the AI detection system may compare vocal characteristics for the primary prompt and the at least one secondary prompt (e.g., primary vocal characteristic data and at least one secondary vocal characteristic data)—including characteristics of the same characteristic type—to determine whether a change has occurred between the primary prompt's response and the at least one secondary prompt's response. In some embodiments, and where the first response of the at least one secondary prompt does not comprise any of the same vocal characteristic types as the primary response's vocal characteristic type(s), then the AI detection system may generate another prompt to request and/or ask the user to perform and/or answer until the same vocal characteristic type for the at least one secondary prompt(s) is received and determined.

As shown in block 218, the process flow 200 may include the step of determining, based on the comparison, whether the vocal request is based on artificial intelligence (AI). In some embodiments, the AI detection system may determine—based on the comparison of the primary vocal characteristic(s)—whether the vocal request (and the responses to the primary prompt and at least one secondary prompt(s)) was generated by AI or generated by a human. Such embodiments are described in further detail below.

In some embodiments, and as shown in block 220, the process flow 200 may include the step of determining the vocal request is based on AI, in an instance where the at least one primary vocal characteristic matches the at least one secondary vocal characteristic. By way of non-limiting example, the AI detection system may determine that there is no change of the primary vocal characteristic(s) and the at least one secondary vocal characteristic(s) to determine the user that generated the vocal request is likely an AI. For instance, and where a plurality of prompts are transmitted to the user device and each prompt requests an action from the user (e.g., for the user to answer a question, perform a sound, and/or the like), an AI would be unlikely to be fatigued and/or annoyed by the plurality of prompts and would, thus, not show a change in the vocal characteristics associated with the plurality of prompts.

In some embodiments, the AI detection system may determine whether the vocal request was AI or human generated based on certain, predetermined characteristic types and their comparisons. Such certain, predetermined characteristic types may be determined by the AI detection system itself (e.g., based on previous instances where AI was confirmed as generating the vocal request and which characteristic types were compared), by a client of the AI detection system (e.g., such as a financial institution associated with the user account identified in the vocal request), and/or the like.

In some embodiments, the AI detection system may additionally and/or alternatively be configured to only determine whether the vocal request was AI or human generated based on threshold of characteristic type comparisons between the primary vocal characteristics and the at least one secondary vocal characteristics, whereby the AI detection system may need to compare a certain number of characteristic types before making the determination. For instance, and in such an embodiment, the threshold of characteristic types to compare may be determined by the AI detection system itself (e.g., based on previous determinations where AI was confirmed as generating the vocal request), by a client of the AI detection system, and/or the like.

In some embodiments, the AI detection system may be configured to determine an AI or human generated the vocal request based on whether a threshold of change between the primary vocal characteristic(s) and the at least one secondary vocal characteristic(s) has been met for the changes in the vocal characteristics. For instance, and where a threshold of change is set, the AI detection system may determine an AI generated the vocal request where the change between the vocal characteristics (primary and at least one secondary) does not meet the threshold. Additionally, and where a threshold of change is set, the AI detection system may determine a human generated the vocal request where the change between the vocal characteristics (primary and at least one secondary) does meet and/or exceed the threshold. Such a threshold may be set by the client of the AI detection system (e.g., the entity associated with the user account, such as the financial institution), the AI detection system itself, and/or the like.

In some embodiments, and as shown in block 222, the process flow 200 may include the step of determining the vocal request is not based on AI, in an instance where the at least one primary vocal characteristic does not match the at least one secondary vocal characteristic. By way of non-limiting example, the AI detection system may determine the vocal request (and the responses to the primary prompt and the at least one secondary prompt(s)) is human generated where there is a change between the primary vocal characteristic(s) and the at least one secondary vocal characteristic(s). For instance, and where a human user is likely showing fatigue, annoyance, and/or another such change in their demeanor as they are given the plurality of prompts, the AI detection system may determine such fatigue, annoyance, and/or change in their demeanor through the comparison of the primary vocal characteristic(s) and the at least one secondary vocal characteristic(s).

FIG. 3 illustrates a process flow 300 for receiving vocal cue data based on response period(s), in accordance with an embodiment of the disclosure. In some embodiments, a system (e.g., similar to one or more of the systems described herein with respect to FIGS. 1A-1C and 2) may perform one or more of the steps of process flow 300. For example, an AI detection system (e.g., the system 130 described herein with respect to FIG. 1A-1C) may perform the steps of process flow 300.

As shown in block 302, the process flow 300 may include the step of transmitting, to a user device associated with the vocal request, the primary prompt at a primary period. In some embodiments, the AI detection system may transmit—to the user device associated with the vocal request (e.g., the user device that transmitted the vocal request to the AI detection system)—the primary prompt generated by the AI detection system at a primary period, whereby the primary period comprises a first period to generate the primary prompt and transmit the primary prompt. As used herein, the first period (i.e., primary period) refers to a period before later periods such as a primary response period, at least one secondary period, at least one secondary response period, and/or the like.

As shown in block 304, the process flow 300 may include the step of receiving, from the user device, the primary vocal cue data at a primary response period associated with the primary period. By way of non-limiting example, the AI detection system may receive—from the user device associated with the vocal request—the primary vocal cue data at a primary response period (e.g., a period after the primary period). Based on this data, the AI detection system may determine the primary vocal characteristic(s) that are used to determine whether the user that generated the vocal request is human or AI.

As show in block 306, the process flow 300 may include the step of transmitting, to the user device associated with the vocal request, the at least one secondary prompt at an at least one secondary period. In some embodiments, the AI detection system may transmit (after generating) at least one secondary prompt to the user device at an at least one secondary period, whereby the at least one secondary period may occur after the primary response period and/or after the primary period. In this manner, the transmission of the at least one secondary prompt may occur after the response to the primary prompt has been received. In some embodiments, and where the at least one secondary prompt comprises a plurality of secondary prompts, the AI detection system may transmit the plurality of secondary prompts to the user device a plurality of secondary periods, whereby the plurality of secondary periods may occur sequentially such that only one secondary prompt is transmitted at a time.

As shown in block 308, the process flow 300 may include the step of receiving, from the user device, the at least one secondary vocal cue data at an at least one secondary response period associated with the at least one secondary period. In some embodiments, the AI detection system may receive—from the user device associated with the vocal request—at least one secondary vocal cue data during at least one secondary response period(s), whereby the at least one secondary response periods may occur close to and after the at least one secondary periods for the transmission of the at least one secondary prompts. In some embodiments, and where the at least one secondary prompt comprises a plurality of secondary prompts, the AI detection system may receive each associated secondary vocal cue data at sequential secondary response periods. In this manner, the AI detection system may be configured to receive each secondary vocal cue data associated with each prompt of the at least one secondary prompts, individually and each receipt is associated with its own response period (i.e., secondary response period).

FIG. 4 illustrates a process flow 400 for detecting triggering a sound capture for a plurality of vocal cues, in accordance with an embodiment of the disclosure. In some embodiments, a system (e.g., similar to one or more of the systems described herein with respect to FIGS. 1A-1C and 2) may perform one or more of the steps of process flow 400. For example, an AI detection system (e.g., the system 130 described herein with respect to FIG. 1A-1C) may perform the steps of process flow 400.

As shown in block 405, the process flow 400 may include the step of triggering, based on the vocal request, a sound capture for a plurality of vocal cues associated with the vocal request, wherein the plurality of vocal cues comprises at least the primary vocal cue data and the at least one secondary vocal cue data. In some embodiments, and as shown herein, the process described herein with respect to block 405 may follow the processes described hereinabove with respect to block 204. In some embodiments, and as shown herein, the process described herein with respect to block 405 may precede the processes described hereinabove with respect to block 206.

By way of non-limiting example, the AI detection system may trigger—once it has received a vocal request—a sound capture for each of the sounds made near the user device. In some embodiments, such a sound capture may be performed by a microphone in the user device, a processor in the user device, a sound-capturing device in the user device, and/or the like. Further, and in some embodiments, such a sound capture may be used to capture the plurality of vocal cues (e.g., responses to the primary and at least one secondary prompts) associated with the vocal cue data.

In some embodiments, and before the vocal request is received, the AI detection system may trigger the sound capture to occur before the vocal request is received, such that the sound capture is always capturing the sound data.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detecting artificial intelligence (AI) masking using persistent response testing, the system comprising:

a memory device with computer-readable program code stored thereon;

at least one processing device operatively coupled to the at least one memory device and the at least one communication device, wherein executing the computer-readable code is configured to cause the at least one processing device to perform the following operations:

identify a vocal request during a user session;

generate a primary prompt associated with the vocal request;

receive, based on the primary prompt, a primary vocal cue data during the user session;

determine at least one primary vocal characteristic based the primary vocal cue data;

generate at least one secondary prompt associated with the vocal request for at least one second period;

receive, based on the at least one secondary prompt, at least one secondary vocal cue data during the user session;

determine at least one secondary vocal characteristic based on the one secondary vocal cue data;

compare the at least one primary vocal characteristic to the at least one secondary vocal characteristic received during the user session; and determine, based on the comparison, whether the vocal request is based on artificial intelligence (AI), wherein, in an instance where the at least one primary vocal characteristic matches the at least one secondary vocal characteristic, determine the vocal request for the user session is based on AI.

2. The system of claim 1, wherein the determination of whether the vocal request is based on AI further comprises:

wherein, in an instance where the at least one primary vocal characteristic does not match the at least one secondary vocal characteristic, determine the vocal request is not based on AI.

3. The system of claim 1, wherein the primary prompt comprises at least one request for at least one vocal cue.

4. The system of claim 1, wherein the computer-readable code is configured to cause the at least one processing device to perform the following operations:

transmit, to a user device associated with the vocal request, the primary prompt at a primary period;

receive, from the user device, the primary vocal cue data at a primary response period associated with the primary period;

transmit, to the user device associated with the vocal request, the at least one secondary prompt at an at least one secondary period; and receive, from the user device, the at least one secondary vocal cue data at an at least one secondary response period associated with the at least one secondary period.

5. The system of claim 1, wherein the computer-readable code is configured to cause the at least one processing device to perform the following operation:

trigger, based on the vocal request, a sound capture for a plurality of vocal cues associated with the vocal request, wherein the plurality of vocal cues comprises at least the primary vocal cue data and the at least one secondary vocal cue data.

6. The system of claim 1, wherein the primary prompt and the at least one secondary prompt are the same.

7. The system of claim 1, wherein the primary vocal characteristic comprises at least one of a volume, frequency, pitch, rate, rhythm, fluency, articulation, pronunciation, enunciation, or tone.

8. The system of claim 7, wherein the at least one secondary vocal characteristic comprises at least one a volume, frequency, pitch, rate, rhythm, fluency, articulation, pronunciation, enunciation, or tone.

9. The system of claim 8, wherein the at least one secondary vocal characteristic is a same characteristic type as the primary vocal characteristic.

10. A computer program product for detecting artificial intelligence (AI) masking using persistent response testing, wherein the computer program product comprises at least one non-transitory computer-readable medium having computer-readable program code portions embodied therein, the computer-readable program code portions which when executed by a processing device are configured to cause the processor to perform the following operations:

identify a vocal request during a user session;

trigger, based on the vocal request, a sound capture for a plurality of vocal cues associated with the vocal request;

generate a primary prompt associated with the vocal request;

receive, based on the primary prompt, a primary vocal cue data during the user session;

determine at least one primary vocal characteristic based the primary vocal cue data;

generate at least one secondary prompt associated with the vocal request for at least one second period;

receive, based on the at least one secondary prompt, at least one secondary vocal cue data during the user session;

determine at least one secondary vocal characteristic based on the one secondary vocal cue data;

compare the at least one primary vocal characteristic to the at least one secondary vocal characteristic received during the user session; and determine, based on the comparison, whether the vocal request is based on artificial intelligence (AI), wherein, in an instance where the at least one primary vocal characteristic matches the at least one secondary vocal characteristic, determine the vocal request for the user session is based on AI.

11. The computer program product of claim 10, wherein the determination of whether the vocal request is based on AI further comprises:

wherein, in an instance where the at least one primary vocal characteristic does not match the at least one secondary vocal characteristic, determine the vocal request is not based on AI.

12. The computer program product of claim 10, wherein the primary prompt comprises at least one request for at least one vocal cue of the plurality of vocal cues.

13. The computer program product of claim 10, wherein the processing device is configured to cause the processor to perform the following operations:

transmit, to a user device associated with the vocal request, the primary prompt at a primary period;

receive, from the user device, the primary vocal cue data at a primary response period associated with the primary period;

transmit, to the user device associated with the vocal request, the at least one secondary prompt at an at least one secondary period; and receive, from the user device, the at least one secondary vocal cue data at an at least one secondary response period associated with the at least one secondary period.

14. The computer program product of claim 10, wherein the primary prompt and the at least one secondary prompt are the same.

15. The computer program product of claim 10, wherein the primary vocal characteristic comprises at least one of a volume, frequency, pitch, rate, rhythm, fluency, articulation, pronunciation, enunciation, or tone.

16. The computer program product of claim 15, wherein the at least one secondary vocal characteristic comprises at least one a volume, frequency, pitch, rate, rhythm, fluency, articulation, pronunciation, enunciation, or tone.

17. The computer program product of claim 16, wherein the at least one secondary vocal characteristic is a same characteristic type as the primary vocal characteristic.

18. A computer implemented method for detecting artificial intelligence (AI) masking using persistent response testing, the computer implemented method comprising:

identifying a vocal request during a user session;

triggering, based on the vocal request, a sound capture for a plurality of vocal cues associated with the vocal request;

generating a primary prompt associated with the vocal request;

receiving, based on the primary prompt, a primary vocal cue data during the user session;

determining at least one primary vocal characteristic based the primary vocal cue data;

generating at least one secondary prompt associated with the vocal request for at least one second period;

receiving, based on the at least one secondary prompt, at least one secondary vocal cue data during the user session;

determining at least one secondary vocal characteristic based on the one secondary vocal cue data;

comparing the at least one primary vocal characteristic to the at least one secondary vocal characteristic received during the user session; and determining, based on the comparison, whether the vocal request is based on artificial intelligence (AI), wherein, in an instance where the at least one primary vocal characteristic matches the at least one secondary vocal characteristic, determining the vocal request for the user session is based on AI.

19. The computer implemented method of claim 18, wherein the determination of whether the vocal request is based on AI further comprises:

wherein, in an instance where the at least one primary vocal characteristic does not match the at least one secondary vocal characteristic, determine the vocal request is not based on AI.

20. The computer implemented method of claim 18, wherein the primary prompt comprises at least one request for at least one vocal cue of the plurality of vocal cues.

* * * * *